United States Patent

Wang et al.

[11] Patent Number: 6,147,160
[45] Date of Patent: Nov. 14, 2000

[54] ORGANOSILANE CURED BUTYL RUBBER/ POLYPROPYLENE TPV

[75] Inventors: Donald S. T. Wang, Akron; Robert E. Medsker, Hartville, both of Ohio

[73] Assignee: Advanced Elastomer Systems, L.P., Akron, Ohio

[21] Appl. No.: 09/201,193

[22] Filed: Nov. 30, 1998

Related U.S. Application Data

[63] Continuation-in-part of application No. 08/749,756, Nov. 1, 1996, Pat. No. 5,936,028, which is a continuation-in-part of application No. 08/566,380, Dec. 1, 1995, Pat. No. 5,672,660.

[51] Int. Cl.[7] .......................................................... C08F 8/00
[52] U.S. Cl. ......................... 525/106; 525/101; 524/506; 524/862
[58] Field of Search ..................... 525/106, 101; 524/506, 862

[56] References Cited

U.S. PATENT DOCUMENTS

| Re. 32,028 | 11/1985 | Fischer | 525/194 |
|---|---|---|---|
| 2,671,774 | 3/1954 | McCracken et al. | 260/80.7 |
| 2,823,218 | 2/1958 | Speier et al. | 260/448.2 |
| 3,037,954 | 6/1962 | Gessler et al. | 260/29.8 |
| 3,220,972 | 11/1965 | Lamoreaux | 260/46.5 |
| 3,584,080 | 6/1971 | Walker et al. | 260/889 |
| 4,046,930 | 9/1977 | Johnson et al. | 427/387 |
| 4,130,534 | 12/1978 | Coran et al. | 260/33.6 AQ |
| 4,130,535 | 12/1978 | Coran et al. | 260/33.6 AQ |
| 4,578,497 | 3/1986 | Onopchenko et al. | 556/479 |
| 4,803,244 | 2/1989 | Umpleby | 525/15 |
| 4,831,081 | 5/1989 | King, III et al. | 525/105 |
| 4,916,180 | 4/1990 | Robinson et al. | 524/456 |
| 5,100,940 | 3/1992 | Wicher | 524/94 |
| 5,100,947 | 3/1992 | Puydak et al. | 524/423 |
| 5,157,081 | 10/1992 | Puydak et al. | 525/237 |
| 5,240,983 | 8/1993 | Tabata et al. | 524/261 |
| 5,384,369 | 1/1995 | Brosins et al. | 525/193 |
| 5,416,147 | 5/1995 | Takarada et al. | 524/399 |
| 5,597,867 | 1/1997 | Tsujimoto et al. | 525/74 |
| 5,672,660 | 9/1997 | Medsker et al. | 525/101 |

FOREIGN PATENT DOCUMENTS

| 0651009 | 5/1995 | European Pat. Off. . |
|---|---|---|
| 0855426 | 4/1997 | European Pat. Off. . |
| 6-212035 | 8/1994 | Japan . |
| 8-73682 | 3/1996 | Japan . |
| 1118327 | 7/1968 | United Kingdom . |

*Primary Examiner*—Margaret G. Moore
*Attorney, Agent, or Firm*—Samuel B. Laferty; William A. Skinner

[57] ABSTRACT

An improved process for the preparation of thermoplastic elastomers by hydrosilylation crosslinking of a butyl rubber component, in which a platinum containing hydrosilylation catalyst is used. The butyl rubber component includes a copolymer of at least isobutylene and an aromatic divinyl compound such as divinylbenzene. The copolymer of at least isobutylene and divinylbenzene is significantly easier to crosslink into a substantially insoluble rubber in a thermoplastic vulcanizate than isobutylene copolymers with only unsaturated repeating units from conjugated dienes. A crosslinked rubber component is obtained in the thermoplastic elastomer composition.

9 Claims, No Drawings

ORGANOSILANE CURED BUTYL RUBBER/ POLYPROPYLENE TPV

CROSS-REFERENCE

This is a continuation-in-part of U.S. patent application Ser. No. 08/749,756, now U.S. Pat. No. 5,936,028, filed Nov. 1, 1996 which is a continuation-in-part of U.S. patent application Ser. No. 08/566,380 filed Dec. 1, 1995 now U.S. Pat. No. 5,672,660, both of said prior references are hereby incorporated by reference.

FIELD OF THE INVENTION

This invention relates to thermoplastic elastomer compositions prepared using hydrosilylation crosslinking of a butyl rubber elastomer component of the composition. The butyl rubber is a copolymer of at least isobutylene and an aromatic divinyl monomer. A thermoplastic elastomer is generally defined as a polymer or blend of polymers that can be processed and recycled in the same way as a conventional thermoplastic material, yet has properties and functional performance similar to that of vulcanized rubber at a desired service temperature. High performance thermoplastic elastomers in which a highly vulcanized rubbery polymer (elastomer) is intimately dispersed in a thermoplastic matrix are generally known as thermoplastic vulcanizates.

BACKGROUND OF THE INVENTION

Polymer blends which have a combination of both thermoplastic and elastic properties are generally obtained by combining a thermoplastic resin with an elastomeric composition in a way such that the elastomer component is intimately and uniformly dispersed as a discrete particulate phase within a continuous phase of the thermoplastic. Early work with vulcanized rubber components is found in U.S. Pat. No. 3,037,954 which discloses both static vulcanization of the rubber, as well as the technique of dynamic vulcanization wherein a vulcanizable elastomer is dispersed into a molten resinous thermoplastic polymer and the elastomer is cured while continuously mixing and shearing the blend. The resulting composition is a micro-gel dispersion of cured elastomer in an uncured matrix of thermoplastic polymer.

In U.S. Pat. No. Re. 32,028 polymer blends comprising an olefin thermoplastic resin and an olefin copolymer are described, wherein the rubber is dynamically vulcanized to a state of partial cure. The resulting compositions are reprocessible. U.S. Pat. Nos. 4,130,534 and 4,130,535 further disclose thermoplastic vulcanizates comprising butyl rubber and polyolefin resin, and olefin rubber and polyolefin resin, respectively. The compositions are prepared by dynamic vulcanization and the rubber component is cured to the extent that it is essentially insoluble in conventional solvents. A range of crosslinking, or curing, agents for the vulcanization of the rubber are described in the early art, including peroxides, sulfurs, phenolic resins, radiation, and the like.

U.S. Pat. No. 4,803,244 generally discusses the use of multifunctional organosilicon compounds in conjunction with a catalyst as an agent for crosslinking the rubber component of a thermoplastic elastomer by hydrosilylation. Hydrosilylation involves the addition of a silicon hydride across a multiple bond, often with a transition metal catalyst. This patent describes a rhodium catalyzed hydrosilylation of EPDM rubber in a blend with polypropylene to produce thermoplastic elastomers having a gel content of up to 34% (after correction for the plastic phase). This degree of vulcanization was achieved only with a high level of catalyst.

A further modification of hydrosilylation crosslinking of the rubber in a thermoplastic elastomer composition is disclosed in European Patent Application No. 651,009. A compatibilizing agent containing in the same molecule a component having an affinity for the rubber and a component having an affinity for the thermoplastic resin is incorporated into the composition, and is said to improve adhesion between the rubber and resin in order to prevent agglomeration.

U.S. Pat. No. 3,584,080 teaches how to prepare copolymers of an isoolefin (e.g. isobutylene) and an aromatic divinyl compound (e.g. divinylbenzene). U.S. Pat. No. 4,916,180 teaches peroxide curing of terpolymers of isobuylene and an divinyl aromatic monomer in the presence of polypropylene.

SUMMARY OF THE INVENTION

The present invention is based on 1) the discovery that the process for hydrosilylation crosslinking of the rubber in a thermoplastic elastomer can be improved by employing a platinum-containing catalyst in combination with an elastomer having predominately sterically unhindered carbon-carbon double bonds and 2) the discovery of specific copolymers of at least isoolefin (e.g. isobutylene) and aromatic divinyl monomers (e.g. divinylbenzene) that are capable of being effectively crosslinked with hydrosilylation crosslinking. This combination provides rapid crosslinking of the elastomer to a fully vulcanized state, yet requires an unexpectedly low concentration of the catalyst in order to achieve the cure. In the instant invention no compatibilizer is required in order to produce compositions with excellent mechanical properties, no bubble formation and very good colorability, due to the extremely low levels of catalyst concentration. Surprisingly, lower catalyst concentrations also produce compositions with much improved heat aging characteristics, resistance to degradation by ultraviolet light and having a non-hygroscopic character.

In a preferred embodiment, the butyl rubber includes a copolymer of isobutylene and divinylbenzene.

In a further embodiment of the invention, additives which react with residual silicon hydride functionality in the thermoplastic elastomer are incorporated into the process. This results in a composition which has further improved long term heat aging characteristics.

The compositions produced by the improved process have utility as replacements for thermoset rubber compounds in a variety of applications, particularly where molding or extrusion is involved and the combination of thermoplastic and elastomeric properties provides an advantage. The particular thermoplastic elastomers of this disclosure using a copolymer of at least an isoolefin and an aromatic divinyl monomer can be transparent or translucent when the refractive indexes of the rubber and thermoplastic are matched or nearly matched. Typical uses include molded articles for automobile underhood parts, engineering and construction materials, mechanical rubber goods, industrial parts such as hose, tubing and gaskets, electrical applications and household goods. Particularly preferred uses as translucent or transparent component in a medical device or food processing equipment. Another use is as a component in electrical devices such as condenser packs. For those uses, the halogen content of the TPV is desirably below 200 ppm.

DESCRIPTION OF THE PREFERRED EMBODIMENTS

Thermoplastic elastomer compositions may generally be prepared by blending a thermoplastic resin and a rubber, then melting the thermoplastic component and mixing the melt until the blend is homogeneous. If a composition of vulcanized rubber in a thermoplastic matrix is desired, crosslinking agents (also referred to as curatives or vulcanizing agents) are added to the blend and crosslinking occurs during the mixing. This latter process is described as dynamic vulcanization.

A wide range of thermoplastic resins and rubbers and/or their mixtures have been used in the preparation of thermoplastic elastomers, including polypropylene, HDPE, LDPE, VLDPE, LLDPE, cyclic olefin homopolymers or copolymers as well as olefinic block copolymers, polystyrene, polyphenylene sulfide, polyphenylene oxide and ethylene propylene copolymer (EP) thermoplastics, with ethylene propylene diene rubber (EPDM), butyl rubber, acrylonitrile butadiene rubber (NBR) and natural rubber (NR) as the elastomers. When the elastomer component is crosslinked, agents such as sulfur, peroxide, phenolics and ionic compounds are often used.

Hydrosilylation Agents

Hydrosilylation has also been disclosed as a crosslinking method. In this method a silicon hydride having at least two SiH groups in the molecule is reacted with the carbon-carbon multiple bonds of the unsaturated (i.e. containing at least one carbon-carbon double bond) rubber component of the thermoplastic elastomer, in the presence of the thermoplastic resin and a hydrosilylation catalyst. Silicon hydride compounds useful in the process of the invention include methylhydrogen polysiloxanes, methylhydrogen dimethylsiloxane copolymers, alkyl methyl polysiloxanes, bis(dimethylsilyl)alkanes and bis(dimethylsilyl)benzene.

Preferred silicon hydride compounds may be described by the formula

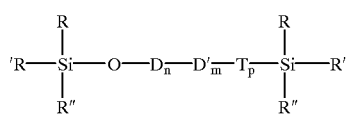

(I)

where each R is independently selected from the group consisting of alkyls comprising 1 to 20 carbon atoms, cycloalkyls comprising 4 to 12 carbon atoms and aryls. In formula (1) it is preferred that each R be independently selected from a group consisting of alkyls comprising 1 to 6 carbon atoms. Even more preferred is R=methyl, R' represents a hydrogen atom, an alkyl or alkoxy group having from 1 to about 24 carbon atoms, R" represents R or a hydrogen atom, D represents the group

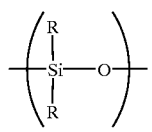

D' represents the group

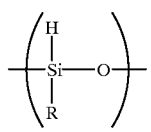

T represents the group

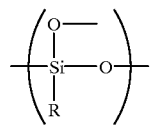

m is an integer having a value ranging from 1 to 50,
n is an integer having a value ranging from 1 to 50, and
p is an integer having a value ranging from 0 to 6.

Particularly preferred polyorganosiloxanes are those in which the silicon atom of the silicon hydride functionality is bound by heteroatoms/atoms having lone pairs of electrons. The preferred polyorganosiloxanes may also be substituted with appropriate functionality permitting solubility in the reaction media. A type of this functionalization is described in U.S. Pat. No. 4,046,930 which teaches alkylation of polyorganosiloxanes. Weight percent of alkylation should not exceed a level that does not permit adequate reaction rates due to steric constraints.

The amount of silicon hydride compound useful in the process of the present invention desirably can range from about 0.1 to about 10.0 mole equivalents of SiH per carbon-carbon double bond in the rubber, and preferably is in the range of about 0.5 to about 5.0 mole equivalents of SiH per carbon-carbon double bond in the rubber component of the thermoplastic elastomer. Lower molecular weight (and equivalent weight) silicon hydride compounds (e.g. lower degrees of polymerization) are generally more effective on a weight basis than higher equivalent weight silicon hydride compounds.

Thermoplastic Resins

Thermoplastic resins useful in the compositions produced by the invention include crystalline polyolefin homopolymers and copolymers. They are desirably prepared from monoolefin monomers having 2 to 20 carbon atoms, such as ethylene, propylene, 1-butene, 1-pentene and the like, as well as copolymers derived from linear and cyclic olefins, with propylene being preferred. Desirably said thermoplastic resin comprises at least 80, 85, 90 or 95 wt % repeat units from a monoolefin monomer having either 2 or 3 carbon atoms. As used in the specification and claims the term polypropylene includes homopolymers of propylene as well as reactor copolymers of polypropylene which can contain about 1 to about 15 or 20 wt % of ethylene or an -olefin comonomer of 4 to 20 carbon atoms, and mixtures thereof. The polypropylene can be crystalline, isotactic or syndiotactic polypropylene. Commercially available polyolefins may be used in the practice of the invention. Other thermoplastic resins which are substantially inert to the rubber, the silicon hydride and the hydrosilylation catalyst would also be suitable. Blends of thermoplastic resins may also be used.

The amount of thermoplastic resin found to provide useful compositions is generally from about 5 to about 90 weight percent, based on the weight of the rubber and resin. Preferably, the thermoplastic resin content will range from about 20 to about 80 percent by weight of the total polymer.

Rubbers

Unsaturated rubbers useful to prepare thermoplastic elastomers according to the invention include monoolefin copolymer rubbers comprising non-polar, rubbery copolymers of two or more -monoolefins, preferably copolymerized with at least one polyene, usually a diene. In an embodiment a copolymer of at least an isoolefin e.g. isobutylene and an aromatic divinyl monomer is preferred as at least part of the rubber component of the thermoplastic vulcanizate. An unsaturated monoolefin rubber such as EPDM rubber is more suitable in some alternate embodiments. EPDM is a polymer of ethylene, propylene and one or more non-conjugated diene or non-conjugated dienes, and the monomer components may be polymerized using Ziegler-Natta or metallocene catalyzed reactions, among others. Satisfactory non-conjugated dienes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (VNB) and the like, or a combination thereof. Decyclopentadiene (DCPD) is generally more hindered than the other dienes and consequently crosslinks slower, as shown in Table II.

In one embodiment of the invention, it has been found that rubber having a structure in which the diene monomer has carbon-carbon multiple bonds which are predominately unencumbered, i.e. bonds which are sterically unhindered such as terminal or pendant double bonds with respect to the polymer chain, provide a greatly improved rate of cure in the hydrosilylation curing process of the invention. Included in this embodiment are structures in which the bonds either normally are unencumbered or are easily isomerized to form a sterically unencumbered double bond, which is then rapidly hydrosilated, e.g. 1,4-hexadiene or ENB. This improvement is particularly significant where a fully cured rubber component is desired. The use of rubber in which the diene component is selected from the group consisting of 5-ethylidene-2-norbornene, 5-methyl-1,4-hexadiene, 1,4-hexadiene and 5-vinyl-2-norbornene is preferred 5-vinyl-2-norbornene is particularly preferred as a diene component of such rubber.

Butyl rubbers are also generally useful in the compositions of the invention. A preferred subset of butyl rubbers that result in low amounts of extractable rubber and good tension set is described in a subsequent paragraph. As used in the specification and claims, the term "butyl rubber" includes copolymers of an isoolefin and a conjugated multiolefin, copolymer of an isoolefin and an aromatic divinyl compound, terpolymers of an isooolefin, a conjugated multiolefin and aromatic divinyl monomers, and the halogenated derivatives of such copolymers and terpolymers. The useful butyl rubber copolymers comprise a major portion of isoolefin and a minor amount, usually less than 30 wt %, of a conjugated multiolefin. The copolymers may comprise about 85–99.5 wt % of a C$_{4-7}$ isoolefin such as isobutylene and about 15–0.5 wt % of a multiolefin of 4–14 carbon atoms, such as isoprene, butadiene, dimethyl butadiene, 4-methyl-1,4-pentadiene and piperylene. Commercial butyl rubber, useful in the invention, is a copolymer of isobutylene and minor amounts of isoprene. Other butyl co- and terpolymer rubbers are illustrated by the description in U.S. Pat. No. 4,916,180 hereby incorporated by reference. Copolymer and terpolymers including repeating units from isobutylene and aromatic divinyl monomers are particularly preferred as an elastomer suitable for hydrosilylation crosslinking. A highly preferred subset of butyl rubbers are those having carbon to carbon double bonds with greater reactivity towards crosslinking reactions than is typically achieved with residual double bonds derived from conjugated dienes. Examples of these double bonds are the residual double bond in aromatic divinyl compounds such as divinylbenzene monomers after copolymerization with isobutylene.

The copolymer of at least an isoolefin and an aromatic divinyl monomer desirably comprises from about 80 to about 99.8 weight percent repeating units from an isoolefin (e.g. isomonoolefin) of 4 to 7 carbon atoms, from about 0 to about 19.8 weight percent repeating units from an aliphatic polyene (e.g. diene) of 4 to 14 carbon atoms and from about 0.2 to about 5 weight percent repeating units from an aromatic divinyl compound of the formula

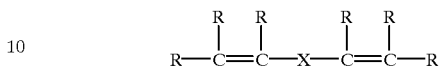

Formula I

Where the symbol X represents an aromatic nucleus and the symbols R which may be the same or different represent hydrogen atoms or alkyl groups of 1 to 5 carbon atoms. X, the aromatic nucleus, can be any aromatic group including those represented by the benzene ring, the naphthalene rings, pyridine ring, and mono or poly alkyl substituted versions thereof. The preferred isoolefin is isobutylene, the preferred polyene is isoprene, and the preferred aromatic divinyl compound is divinylbenzene. U.S. Pat. No. 3,584,080 is incorporated by reference for a more detailed description of the copolymer. Preferably the repeating units from the polyene is from about 0.1 to about 5 weight percent of the copolymer. Preferably the repeating units from aromatic divinyl compound is from about 0.2 to 4 weight percent (2000 to 40,000 ppm) and more preferably from about 0.5 to about 3 weight percent (5000 to 30,000 ppm) of the copolymer. It is noted that a large portion of the unsaturated repeat units from the aromatic divinyl compound are consumed in crosslinking reactions during polymerization and are not available as unsaturated units (i.e. they are converted to saturated crosslinks) for further hydrosilylation crosslinking.

Preferred butyl rubbers thus comprise copolymers of at least an isoolefin and an aromatic divinyl compound. The repeat units therein with unsaturation from an aromatic divinyl compound are desirably present from about 50 to about 5000 ppm (0.005 to about 0.5 wt % based on the total amount of butyl rubber) and more desirably from about 200 to about 2500 ppm. The repeat units from an isoolefin desirably are from about 85 to 99.5 wt % and repeat units from a multiolefin (polyene) of 4–14 carbon atoms can be absent or present in an amount from about 0.5 to about 15 wt % based on the total amount of butyl rubber copolymer. A percentage of the repeat units from divinylbenzene may be present as repeat units without residual unsaturation. As the repeat units from aromatic divinyl compounds (e.g. divinylbenzene) are very reactive to crosslinking, it is sometimes desirable to dilute the copolymers of isobutylene and aromatic divinyl compounds with more conventional butyl rubbers described in the previous paragraph. A commercial example of a copolymer of isobutylene and divinylbenzene is Polysar Butyl XL 10000 available from Bayer Corporation. Said Polysar Butyl XL 10000 has a Mooney viscosity 1+8 @ 125° C. of 60–75 and has 20–30 wt % of the polymer soluble in cyclohexane. XL 10000 starts with about 2000 ppm unsaturated repeat units from divinylbenzene. Butyl rubbers are also available from Bayer as XL 68102 having at 1500 ppm unsaturated repeat units from divinylbenzene and Mooney viscosity of 59–75 and XL 30102 having about 600 ppm unsaturated repeat units from divinylbenzene and a Mooney viscosity from about 67–83. The products with designations XL 68102 and XL 30102 are believed to be blends of two different butyl rubbers, one with repeat units from divinylbenzene and one without such repeat units (e.g. a butyl rubber of isobutylene and a conjugated diene).

An unsaturated repeat unit from an aromatic divinyl compound will desirably have the structure:

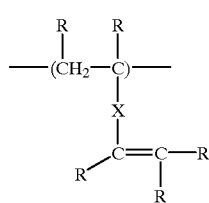

Formula II

Where X and R are as previously defined.

A close examination of this repeat units reveals that the carbon to carbon double bond has little steric hindrance and some mobility with respect to the polymer backbone which may facilitate its reaction with hydrosilylation crosslinking agents.

A further rubber suitable in the invention is natural rubber. The main constituent of natural rubber is the linear polymer cis-1,4-polyisoprene. It is normally commercially available in the form of smoked sheets and crepe. Synthetic polyisoprene can also be used with the particularly preferred synthetic polyisoprene elastomers being those that contain vinyl functionality pendant to the main polymer chain, i.e. 1,2-enchainments.

Polybutadiene is also a suitable elastomer for hydrosilylation curing, with polybutadienes that contain vinyl functionality being the most preferred.

Blends of any of the above rubbers may also be employed, rather than a single unsaturated rubber.

In preparing the compositions of the invention, the amount of rubber generally ranges from about 95 to about 10 weight percent, based on the weight of the rubber and thermoplastic resin. Preferably, the rubber content will be in the range of from about 80 to about 20 weight percent of total polymer of the thermoplastic vulcanizate (e.g. the total of the thermoplastic and the rubber).

Hydrosilylation Catalysts

It has previously been understood that any catalyst, or catalyst precursor capable of generating a catalyst in situ, which will catalyze the hydrosilylation reaction with the carbon-carbon bonds of the rubber can be used. Such catalysts have included transition metals of Group VIII such as palladium, rhodium, platinum and the like, including complexes of these metals. Chloroplatinic acid has been disclosed as a useful catalyst in U.S. Pat. No. 4,803,244 and European Application No. 651,009, which further disclose that the catalyst may be used at concentrations of 5 to 10,000 parts per million by weight and 100 to 200,000 parts per million by weight based on the weight of rubber, respectively.

It has been found in the process of the present invention that significantly lower concentrations of platinum-containing catalyst can be used, while obtaining improvement in both the speed of the reaction and the efficiency of the crosslinking. Concentrations of catalyst in the range of about 0.1 to about 10, 20 or 40 expressed as parts by weight of platinum metal per one million parts by weight of rubber, are effective in rapidly and completely curing the rubber from isobutylene and aromatic divinyl monomers in the process of dynamically vulcanizing blends of thermoplastic resin and rubber. These low catalyst concentrations are particularly effective in combination with a diene-containing rubber having carbon-carbon multiple bonds which are predominately sterically unhindered Catalyst concentrations of about 1 to about 25 parts per million by weight based on the weight of rubber, expressed as platinum metal, are particularly preferred.

Platinum-containing catalysts which are useful in the process of the invention are described, for example, in U.S. Pat. No. 4,578,497; U.S. Pat. No. 3,220,972; and U.S. Pat. No. 2,823,218 all of which are incorporated herein by this reference. These catalysts include chloroplatinic acid, chloroplatinic acid hexahydrate, complexes of chloroplatinic acid with sym-divinyltetramethyldisiloxane, dichloro-bis (triphenylphosphine) platinum (II), cis-dichloro-bis (acetonitrile) platinum (II), dicarbonyldichloroplatinum (II), platinum chloride and platinum oxide. Zero valent platinum metal complexes such as Karstedt's catalyst are particularly preferred, as described in U.S. Pat. No. 3,775,452; U.S. Pat. No. 3,814,730; and U.S. Pat. No. 4,288,345 all of which are incorporated herein by this reference.

In order for the catalyst to function most efficiently in the dynamic vulcanization environment, it is important that it is inherently thermally stable, or that its activity is inhibited to prevent too rapid a reaction or catalyst decomposition. Appropriate catalyst inhibitors that are suitable to stabilize the platinum catalyst at high temperatures include 1,3,5,7-tetravinyl-1,3,5,7-tetramethylcyclotetrasiloxane and its higher analogs such as vinyl cyclic pentamer. However, other olefins that are stable above 165° C. are also useful. These include maleates, fumarates and the cyclic pentamer. It is also particularly preferred in the invention to use a catalyst that remains soluble in the reaction medium.

Additives

The thermoplastic elastomer may contain conventional additives, which can be introduced into the composition in the thermoplastic resin, the rubber, or in the blend either before, during or after the hydrosilylation and curing. Examples of such additives are antioxidants, processing aids, reinforcing and nonreinforcing fillers, pigments, waxes, rubber processing oil, extender oils, antiblocking agents, antistatic agents, ultraviolet stabilizers, plasticizers (including esters), foaming agents, flame retardants and other processing aids known to the rubber compounding art. Such additives may comprise from about 0.1 to about 300 percent by weight based on the weight of the final thermoplastic elastomer (vulcanizate) product. Fillers and extenders which can be utilized include conventional inorganics such as calcium carbonate, clays, silica, talc, titanium dioxide, carbon black and the like. Additives, fillers or other compounds which may interfere with the hydrosilylation should be added after curing reaches the desired level (e.g. the desired extent of crosslinking of the rubber).

In another embodiment, it has been found that the heat aging properties of compositions prepared according to the invention can be greatly improved by the addition of a metal chelating agent to the blend. This effect is believed to be due to the fact that the hydrosilylation catalyst is in an active valence state. This form of the platinum metal accelerates degradation of the thermoplastic elastomer, particularly under conditions of elevated temperature over an extended time. Chelation prevents the metal from causing degradation.

Typical chelating agents useful for this purpose include materials such as 1,2-bis(3,5-di-ter-butyl-4-hydroxyhydrocinnamoyl)hydrazine and the like. Surprisingly, these agents may be incorporated into the composition prior to or after the hydrosilylation curing. Amounts of chelating agent ranging from about 0.025 parts per hundred parts of rubber (phr) to about 10 phr have been found to be useful, and amounts in the range of about 0.1 phr to 2 phr are preferred.

In a further embodiment of the invention, it has been demonstrated that reducing residual or unreacted silicon hydride functionality in the thermoplastic elastomer products results in compositions which have improved heat stability. Unreacted silicon hydride may be reduced or eliminated by reacting the silicon hydride with compounds containing active hydrogen, carbon-carbon multiple bonds, carbon-oxygen double bonds or carbon-nitrogen double bonds and the like. The residual silicon hydride reacts with these compounds to eliminate silicon hydride functionality and form silicon-oxygen or carbon-silicon bonds.

Typical compounds useful for this purpose are silica and water. These agents are incorporated into the composition after the hydrosilylation cure is complete. Water may be introduced as steam anytime after cure in a single or two pass operation. Amounts of such compounds may be estimated by measuring residual silicon hydride and adding a stoichiometric amount of the compound. One may also desire adding a stoichiometric excess if necessary to eliminate a sufficient amount of the residual silicon hydride in order to realize the desired improvement in heat aging properties. Amounts of such compounds ranging from about one mole equivalent to about 10 mole equivalents have been found to be useful, and amounts in the range of about 1 to 3 mole equivalents are preferred.

Extender Oil

The rubber processing or extender oils used in thermoplastic elastomers generally are paraffinic, naphthenic or aromatic oils derived from petroleum fractions. Polybutene oils are useful when the elastomer portion of the termoplastic elastomer are butyl rubbers. The type will be that ordinarily used in conjunction with the specific rubber or rubbers present in the composition, and the quantity based on the total rubber content of the thermoplastic elastomer may range from zero to several hundred parts per hundred rubber. Important to the efficiency of the catalyst is that the oils and other additives contain no or very low concentrations of compounds that are catalyst inhibitors or that interfere with the activity of the catalyst. These compounds include phosphines, amines, sulfides, thiols or other compounds that may be classified as Lewis bases. Lewis bases, or other compounds that have a pair of electrons available for donation, will react with the platinum catalyst, effectively neutralizing its activity. It has been discovered that the presence of such compounds has a surprisingly detrimental impact on hydrosilylation curing in the process of dynamic vulcanization of the rubber component of the thermoplastic elastomer compositions. If the concentration of compounds which have the chemical reactivity of Lewis bases, such as compounds containing sulfur or nitrogen, is maintained at or below a level which provides less than about 1000 ppm and 300 ppm of sulfur and nitrogen respectively, then the amount of platinum catalyst required to promote efficient hydrosilylation curing in dynamic vulcanization can be substantially reduced, usually to the range of about 4 ppm or less, without impact on the cure state of the rubber or the tensile properties of the thermoplastic elastomer product. Concentrations of sulfur and nitrogen below about 500 and 200 ppm respectively are more preferred, and concentrations of less than about 30 ppm sulfur and less than about 100 ppm nitrogen are most preferred. It has been discovered that, even at catalyst concentrations as low as 0.25 ppm, full cure of the elastomer can be achieved if the concentration of sulfur and nitrogen is within the most preferred ranges.

Most paraffinic petroleum oils for the rubber industry are derived from a crude oil distillation stream. A typical refining history would include some type of dewaxing to reduce the pour point, a solvent extraction to physically remove aromatic compounds and a hydrotreating process to chemically modify aromatic structures. Both extraction and hydrotreating result in a net increase in the total concentration of saturated hydrocarbon structures and a net decrease in the total aromatic, sulfur and nitrogen-containing compound concentration. The degree of reduction in concentration of these compounds in the oil is dependent upon the type and severity of the refining employed, and the nature of the crude oil. White and paraffinic oils have been treated more extensively than aromatic and napthenic oils and would contain a smaller concentration of aromatic, sulfur and/or nitrogen compounds. It is difficult to elucidate the exact chemical structure of these compounds due to their complexity. The tendency of an oil to interfere with platinum catalyzed hydrosilylation is directly related to the concentration of sulfur and nitrogen containing compounds, as well as compounds which contain phosphorus, tin, arsenic, aluminum and iron.

Processing

The rubber component of the thermoplastic elastomer is generally present as small, i.e. micro-size, particles within a continuous thermoplastic resin matrix, although a co-continuous morphology or a phase inversion is also possible depending upon the amount of rubber relative to plastic and the degree of cure of the rubber. The rubber is desirably at least partially crosslinked, and preferably is completely or fully crosslinked. It is preferred that the rubber be crosslinked by the process of dynamic vulcanization. As used in the specification and claims, the term "dynamic vulcanization" means a vulcanization or curing process for a rubber blended with a thermoplastic resin, wherein the rubber is vulcanized under conditions of shear at a temperature at which the mixture will flow. The rubber is thus simultaneously crosslinked and dispersed as fine particles within the thermoplastic resin matrix, although as noted above other morphologies may exist. Dynamic vulcanization is effected by mixing the thermoplastic elastomer components at elevated temperatures in conventional mixing equipment such as multiple roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

The terms "fully vulcanized" and "fully cured" or "fully crosslinked" as used in the specification and claims means that the rubber component to be vulcanized has been cured or crosslinked to a state in which the elastomeric properties of the crosslinked rubber are similar to those of the rubber in its conventional vulcanized state, apart from the thermoplastic elastomer composition. The degree of cure can be described in terms of gel content, or conversely, extractable components. Gel content reported as percent gel (based on the weight of crosslinkable rubber) is determined by a procedure which comprises determining the amount of insoluble polymer by soaking the specimen for 48 hours in organic solvent at room temperature, weighing the dried residue and making suitable corrections based upon knowledge of the composition. Thus, corrected initial and final weights are obtained by subtracting from the initial weight the weight of soluble components, other than rubber to be vulcanized, such as extender oils, plasticizers and components of the composition soluble in organic solvent, as well as that rubber component of the product which is not intended to be cured. Any insoluble polyolefins, pigments, fillers, and the like are subtracted from both the initial and final weights. The rubber component can be described as fully cured when less than about 20, less than about 5%, and preferably less than 3%, of the rubber which is capable of being cured by hydrosilylation is extractable from the thermoplastic elastomer product by a solvent for that rubber. Alternatively the degree of cure may be expressed in terms of crosslink density. All of these descriptions are well known in the art, for example in U.S. Pat. Nos. 4,593,062, 5,100,947 and 5,157,081, all of which are fully incorporated herein by this reference.

The following general procedure was used in the preparation of thermoplastic elastomers by the process of the invention, as set forth in the examples. The thermoplastic resin and oil extended rubber were placed in a heated internal mixer, with the hydrosilylation agent and hydrosilylation catalyst. The hydrosilylation agent and catalyst can be incorporated into the composition by any suitable technique, for example by injection as solutions in oil or as neat components, although a dilute catalyst solution is preferred. Additives such as antioxidants, ultraviolet stabilizers and fillers may also be added as a slurry in oil. Masterbatches of the components may also be prepared to facilitate the blending process. The mixture was heated to a temperature sufficient to melt the thermoplastic component, and the mixture was masticated, with added processing oil if desired, until a maximum of mixing torque indicated that vulcanization had occurred. Mixing was continued until the desired degree of vulcanization was achieved.

The order of addition of the hydrosilylation agent and hydrosilylation catalyst was found to be important. Maximum catalyst efficiency was obtained when the hydrosilylation agent was added first to the blend, followed by the hydrosilylation catalyst. The mechanical properties of the thermoplastic elastomer products, as well as the degree of cure, were improved when this order of addition was followed.

The invention will be better understood by reference to the following examples which serve to illustrate but not limit the present process. In the examples, the following test methods were used to determine the properties of the thermoplastic elastomer products.

Hardness (Shore A/D)—ASTM D 2240

Ultimate tensile strength (UTS-psi)—ASTM D 412

Ultimate elongation (UE-%)—ASTM D 412

Modulus at 100% elongation (M1 or M-100-psi)—ASTM D412

Gel content (%)—ASTM D2765

Tension set (TS-%)—ASTM D 412

Oil swell (OS-%)—ASTM D 471

Heat aging—ASTM D 573

The rubber component used in the compositions prepared according to the examples are further identified as follows.

EPDM Rubber "A"—EPDM-2.1% ENB; 52% ethylene
EPDM Rubber "B"—EPDM-5% HD; 55% ethylene
EPDM Rubber "F"—EPDM-3% VNB; 55% ethylene
EPDM Rubber "G"—EPDM-5.5% ENB; 60% ethylene
Butyl Rubber "A"—Butyl XL 10,000 from Polysar
Butyl Rubber "B"—Butyl XL30102 from Polysar
Butyl Rubber "C"—Butyl XL 68102 from Polysar
Butyl Rubber "D"—Butyl 268 rubber from Exxon
Polypropylene "A"—Homopolypropylene MFI=0.7
Polypropylene "B"—Low molecular weight Homopolypropylene MFI=2600
Polypropylene "C"—Copolymer of propylene and ethylene MFI=4
Polypropylene "D"—Homopolypropylene MFI=14
Polypropylene "E"—Homo-polypropylene MFI=20
Polypropylene "F"—Syndiotactic polypropylene MFI=10
Si—H "A"—2-2822 from Dow Corning, Hydrosilylation agent
Catalyst "A"—PC-085 1.0 wt % in paraffinic oil from Dow Corning (Platinum)
Oil (Polybutene) "A"—Exxon Parapol 950
Oil (Polybutene) "B"—Exxon Parapol 450
Oil (Paraffinic) "C"—Britol 20T mineral oil from Witco Compositions were prepared by the method of the invention as generally described above, using polypropylene resin and EPDM rubber containing ENB, HD and VNB as the diene component. Compositions were also prepared using polypropylene and various butyl rubbers. Control samples used Butyl 268 which included repeating units from conventional dienes for crosslinking purposes. Examples of the invention used butyl rubber or mixtures of butyl rubbers that have repeat units from divinyl benzene. The plastic and rubber components were melt mixed in a Brabender mixer at 180C until the polypropylene was melted. Silicone hydride (alkylated methyl hydrogen polysiloxane) was added dropwise to the melt mix, followed by addition of an oil solution containing platinum [platinate (II) hexachloro, dihydrogen reaction product with 2,4,6,8-tetraethenyl-2,4,6,8-tetramethyl cyclotetrasiloxane]. The rubber was dynamically vulcanized by mixing the blend until the maximum torque was reached. The product was removed from the mixer, then returned to the mixer and masticated at 180C for an additional minute. Plaques were prepared by compression molding the products of the dynamic vulcanization at 200C to a thickness of 60 mil and cooling under pressure, and the physical properties were determined using these plaques. All of the products were elastomeric, as defined by ASTM D1566, i.e. all had tension set values of less than 50%. The compositions and their properties are set forth in Tables I through V.

EXAMPLE 1

Example 1 of U.S. Pat. No. 4,803,244 is also set forth in comparison to several EPDM rubbers crosslinked with a platinum catalyst. In this comparative example, similar resin and rubber components were dynamically vulcanized by hydrosilylation, but the equivalent of 35 ppm of rhodium metal was used as the catalyst.

TABLE I

| Composition | I | Patent Ex. 1 of U.S. Pat. No. 4,803,244 | II | III | IV |
|---|---|---|---|---|---|
| Polypropylene A (parts) | 67 | 50 | 67 | 41 | 41 |
| EPDM Rubber "A" (parts) | 100 | 100 | — | — | — |
| EPDM Rubber "B" (parts) | — | — | 100 | — | — |
| EPDM Rubber "F" (parts) | — | — | — | 100 | — |
| EPDM Rubber "G" (parts) | — | — | — | — | 100 |
| Si-H A (phr) | 2.5 | 6.7 | 3 | 2.2 | 3 |
| Rhodium (ppm) | — | 35 | — | — | — |
| Platinum (ppm) | 15 | — | 7.6 | 4 | 13 |
| Hardness (A/D) | 93/40 | 88/26 | 39 D | 69 A | 63 A |

TABLE I-continued

| Composition | I | Patent Ex. 1 of U.S. Pat. No. 4,803,244 | II | III | IV |
|---|---|---|---|---|---|
| UTS (psi) | 2500 | 769 | 2210 | 1080 | 905 |
| UE (%) | 405 | 240 | 330 | 211 | 406 |
| M1 | 1750 | 305 | 1510 | 636 | 408 |
| TS (%) | 22 | 43 | 24 | — | — |
| Gel (%) (corrected for plastic phase) | 95 | 15 | 92 | 99 | 90 |

The composition III and IV also contained 130 phr paraffin oil, 42 phr clay, 5 phr wax, 2 phr ZnO It can be seen that the use of much lower levels of platinum catalyst in the hydrosilylation crosslinking of Rubbers A, B, F and G (EPDM rubbers containing 2.1% ENB, 5% HD, 3% VNB, and 5.5% ENB) results in a marked increase in the level of crosslinking (as reflected by gel content) and improved tensile properties in the thermoplastic elastomer, as compared to the use of rhodium as the catalyst.

EXAMPLE 2

Three different butyl rubber copolymers including at least repeat units from isobutylene and divinylbenzene were formulated into thermoplastic vulcanizates crosslinked by hydrosilylation. The butyl rubbers (A, B and C) represent three different concentrations of residual unsaturation from divinylbenzene (2000, 600, and 1500 ppm) respectively. The fact that all three compositions Va, VIa, and VIIa all have comparable physical properties and no trends exist, as the amount of residual unsaturation from divinylbenzene decreases, is indicative of sufficient active unsaturation in all the butyl rubbers. Butyl rubbers A-C are all believed to include terpolymers of isobutylene, a conjugated diene, and divinylbenzene. Butyl rubbers B-C are believed to be blends of a copolymer of isobutylene, divinylbenzene, and a conjugated diene with a copolymer of isobutylene and a conjugated diene.

TABLE II

| COMPOSITION | Va Wt % | VIa Wt % | VIIa Wt % |
|---|---|---|---|
| Ingredients | | | |
| Butyl Rubber A | 47.39 | | |
| Butyl Rubber B | | 47.39 | |
| Butyl Rubber C | | | 47.39 |
| Polypropylene B | 2.37 | 2.37 | 2.37 |
| Polypropylene C | 9.48 | 9.48 | 9.48 |
| Polypropylene D | 9.48 | 9.48 | 9.48 |
| Si-H A | 2.84 | 2.84 | 2.84 |
| Catalyst A | 4.74 | 4.74 | 4.74 |
| Oil (paraffinic) C | 23.70 | 23.70 | 23.70 |
| Total | 100.00 | 100.00 | 100.00 |
| ROOM TEMPERATURE PROPERTY | | | |
| Hardness A, 5 sec | 57 | 53 | 56 |
| UE, % | 215 | 230 | 235 |
| UTS, psi | 669 | 527 | 528 |
| M-100, psi | 351 | 370 | 293 |
| Tear Strength, pli | 84 | 114 | 97 |
| Tension Set, % | 6 | 15 | 11 |
| Comp, Set, 22 hrs, 70 C. | 24 | 31 | 31 |

EXAMPLE 3

This example is similar to Example 2 and Table II except the extender oil used is Oil (polybutene) "A" or Oil (polybutene) "B" rather than Oil (paraffinic) "C". The compositions have a suffix b or c indicating variations of the prior examples which had a suffix "a". The samples with the suffix "b" use polybutene oil "A" while the samples with the suffix "c" use polybutene oil "B" instead of paraffinic oil "C". Composition VIIc (a control) does not include a copolymer of at least isobutylene and divinylbenzene. The physical properties of Composition VIIIc are dramatically inferior which is interpreted to be caused by a lower level of crosslinking due to a lack of unsaturation from divinylbenzene in the butyl rubber. Composition VIIIc can be used as a control for any of the other compositions which include a copolymer of at least isobutylene and divinylbenzene.

TABLE III

| COMPOSITION | Vb Wt % | VIb Wt % | VIIb Wt % | Vc Wt % | VIIIc Wt % |
|---|---|---|---|---|---|
| Ingredients | | | | | |
| Butyl Rubber "A" | 47.39 | | | 47.39 | |
| Butyl Rubber "B" | | 47.39 | | | |
| Butyl Rubber "C" | | | 47.39 | | |
| Butyl Rubber "D" (Cntrl) | | | | | 47.39 |
| Polypropylene "B" | 2.37 | 2.37 | 2.37 | | |
| Polypropylene "C" | 9.48 | 9.48 | 9.48 | 11.85 | 11.85 |
| Polypropylene "D" | 9.48 | 9.48 | 9.48 | 9.48 | 9.48 |
| Si-H "A" | 2.84 | 2.84 | 2.84 | 2.84 | 2.84 |
| Catalyst "A" | 4.74 | 4.74 | 4.74 | 4.74 | 4.74 |
| Oil (polybutene) "A" | 23.70 | 23.70 | 23.70 | | |
| Oil (polybutene) "B" | | | | 23.70 | 23.70 |
| Total | 100.00 | 100.00 | 100.00 | 100.00 | 100.00 |
| ROOM TEMPERATURE PROPERTY | | | | | |
| Hardness A, 5 sec | 60 | 52 | 59 | 53 | 30 |
| UE, % | 256 | 319 | 285 | 237 | 124 |
| UTS, psi | 660 | 422 | 644 | 796 | 112 |
| M-100, psi | 326 | 302 | 322 | 360 | 112 |
| Tear Strength, pli | 128 | 143 | 131 | 78 | 39 |
| Tension Set, % | 10 | 26 | 15 | 6 | 55 |
| Comp, Set, 22 hrs, 70 C. | 27 | 46 | 38 | 24 | 100 |

EXAMPLE 4

This example is similar to Example 3, Table III and varies from that Example by using less of Catalyst A (2.46 wt % of a 1 wt % solution in paraffinic vs 4.74 wt %), less Si—H "A" (1.48wt % versus 2.84 wt %) and the addition of a more flexible polypropylene (Polypropylene D) into the compositions. The physical properties of the resulting vulcanizates were not appreciably affected by the reduction in the amount of Si—H and catalyst.

TABLE IV

| COMPOSITION | Vd Wt % | VId Wt % | VIId Wt % | VIIId Wt % |
|---|---|---|---|---|
| Ingredients | | | | |
| Butyl Rubber "A" | 49.26 | | | |
| Butyl Rubber "B" | | 49.26 | | |
| Butyl Rubber "C" | | | 49.26 | |
| Butyl Rubber "D" (Cntrl) | | | | 49.26 |
| Polypropylene "C" | 12.32 | 12.32 | 12.32 | 12.32 |
| Polypropylene "D" | 9.85 | 9.85 | 9.85 | 9.85 |

TABLE IV-continued

| COMPOSITION | Vd Wt % | VId Wt % | VIId Wt % | VIIId Wt % |
|---|---|---|---|---|
| Si-H "A" | 1.48 | 1.48 | 1.48 | 1.48 |
| Catalyst "A" | 2.46 | 2.46 | 2.46 | 2.46 |
| Oil (polybutene) "A" | 24.63 | 24.63 | 24.63 | 24.63 |
| Total | 100.00 | 100.00 | 100.00 | 100.00 |
| ROOM TEMPERATURE PROPERTY | | | | |
| Hardness A, 5 sec | 56 | 50 | 54 | 36 |
| UE, % | 286 | 343 | 338 | 737 |
| UTS, psi | 907 | 428 | 682 | 128 |
| M-100, psi | 353 | 268 | 310 | 122 |
| Tear Strength, pli | 87 | 109 | 108 | 50 |
| Tension Set, % | 6 | 18 | 13 | 35 |
| Comp, Set, 22 hrs, 70 C. | 25 | 50 | 39 | 81 |

EXAMPLE 5

The first three compositions (Ve–VIIe) of this example are similar to Example 4 except for the substitution of Oil (polybutene) "B" for Oil (polybutene) "A". Compositions Vf and Vg vary from composition Ve in that they have lower amounts of Catalyst "A" (1.49 and 1.00 wt % respectively versus 2.46 wt %). This further reduction in the amount of catalyst (further with respect to Table III where it was 4.74 wt %) did not significantly affect the physical properties.

TABLE V

| COMPOSITION | Ve Wt % | VIe Wt % | VIIe Wt % | Vf Wt % | Vg Wt % |
|---|---|---|---|---|---|
| Ingredients | | | | | |
| Butyl Rubber A | 49.26 | | | 49.75 | 50.00 |
| Butyl Rubber B | | 49.26 | | | |
| Butyl Rubber C | | | 49.26 | | |
| Polypropylene C | 12.32 | 12.32 | 12.32 | 12.44 | 12.50 |
| Polypropylene D | 9.85 | 9.85 | 9.85 | 9.95 | 10.00 |
| Si-H "A" | 1.48 | 1.48 | 1.48 | 1.49 | 1.50 |
| Catalyst "A" | 2.46 | 2.46 | 2.46 | 1.49 | 1.00 |
| Oil (polybutene) B | 24.63 | 24.63 | 24.63 | 24.88 | 25.00 |
| Total | 100.00 | 100.00 | 100.00 | 100.00 | 100.00 |
| ROOM TEMPERATURE PROPERTY | | | | | |
| Hardness A, 5 sec | 53 | 47 | 47 | 53 | 57 |
| UE, % | 342 | 284 | 300 | 314 | 327 |
| UTS, psi | 831 | 350 | 632 | 959 | 879 |
| M-100, psi | 301 | 240 | 307 | 340 | 320 |
| Tear Strength, pli | 83 | 86 | 86 | 87 | 83 |

TABLE V-continued

| COMPOSITION | Ve Wt % | VIe Wt % | VIIe Wt % | Vf Wt % | Vg Wt % |
|---|---|---|---|---|---|
| Tension Set, % | 6 | 15 | 10 | 8 | 5 |
| Comp, Set, 22 hrs, 70 C. | 26 | 51 | 38 | 27 | 24 |

While the best mode and preferred embodiment of the invention have been set forth in accord with the Patent Statutes, the scope of the invention is not limited thereto, but rather is defined by the attached claims.

What is claimed is:

1. A thermoplastic vulcanizate comprising
   a) a thermoplastic resin
   b) a crosslinked butyl rubber containing repeating units derived from copolymerizing an aromatic divinyl compound and including a hydrosilylation crosslinking agent chemically crosslinking said butyl rubber by forming bonds between said repeating units.

2. A thermoplastic vulcanizate according to claim 1, wherein said thermoplastic resin is a thermoplastic polyolefin resin.

3. A thermoplastic vulcanizate according to claim 2, wherein said repeating units derived from copolymerizing an aromatic divinyl compound are present in amounts from about 0.2 to about 5 weight percent based upon said butyl rubber.

4. A thermoplastic vulcanizate according to claim 3, wherein said repeating units are derived from copolymerizing divinylbenzene and are present from about 0.2 to about 4 weight percent and said butyl rubber further including from about 1 to about 5 weight percent repeating units derived from copolymerizing a polyene having from 4 to 14 carbon atoms.

5. A thermoplastic vulcanizate according to claim 1, wherein said thermoplastic resin comprises at least 85 weight percent repeating units from propylene.

6. A molded or extruded article comprising the thermoplastic vulcanizate of claim 3.

7. A molded or extruded article according to claim 6, in the form of a translucent or transparent component to a medical device or food processing equipment.

8. A molded or extruded article according to claim 6 having a halogen content of less than 200 ppm.

9. A molded or extruded article according to claim 8 used in an electrical condenser pack.

* * * * *